United States Patent [19]

Ingram

[11] Patent Number: 4,842,553
[45] Date of Patent: Jun. 27, 1989

[54] METHOD AND ASSEMBLY FOR TERMINATING A CONDUCTIVE POLYMER-SHIELDED COAXIAL ELECTRICAL CABLE

[75] Inventor: Glenn B. Ingram, Flagstaff, Ariz.

[73] Assignee: W. L. Gore & Associates, Inc., Newark, Del.

[21] Appl. No.: 160,963

[22] Filed: Feb. 26, 1988

[51] Int. Cl.$^4$ .......................................... H01R 17/18
[52] U.S. Cl. .................................. 439/583; 439/840; 29/861; 29/754
[58] Field of Search ................ 439/840, 841, 578–585, 439/63, 98, 99, 448, 447, 445, 604, 730, 932, 271–283; 29/874, 857, 859, 861, 863, 867, 747, 748, 754; 174/75 C, 88 C, 89

[56] References Cited

U.S. PATENT DOCUMENTS

| | | | |
|---|---|---|---|
| 1,920,553 | 8/1933 | Fossati | 439/447 |
| 2,983,779 | 5/1961 | Dumire et al. | 439/578 |
| 3,701,080 | 10/1972 | Baisz et al. | 174/75 C |
| 4,221,457 | 9/1980 | Allen et al. | 439/841 |
| 4,673,231 | 6/1987 | McAnulty, Sr. | 439/278 |

FOREIGN PATENT DOCUMENTS 0139211 11/1947 Australia ............................ 439/840

Primary Examiner—David Pirlot
Attorney, Agent, or Firm—John S. Campbell

[57] ABSTRACT

A method and assembly for electrically and mechanically terminating a conductive polymer-shielded coaxial electrical cable by wrapping the shield layer of the end of the cable under tension with a conductive metal spring and binding the cable and spring into firm contact with the parts of a standard coaxial connector by force of a threaded plug.

6 Claims, 1 Drawing Sheet

METHOD AND ASSEMBLY FOR TERMINATING A CONDUCTIVE POLYMER-SHIELDED COAXIAL ELECTRICAL CABLE

FIELD OF THE INVENTION

This invention relates to methods for terminating coaxial cables which have electrically conductive outer polymeric shielding material surrounding the metallic center signal conductor and the insulative dielectric material surrounding the center conductor.

BACKGROUND OF THE INVENTION

Terminating easily and effectively coaxial electrical cables having non-metallic conductive polymeric shielding surrounding the metal center conductor and the primary dielectric insulating that conductor has been a source of problems in cable manufacture. No fail-safe mechanical interface has been developed and integral soldering has not been feasible. Conductive adhesives and conductive potting compounds have been tried with the attendant adhesive to metal bonding problem and the filling and curing times associated with the potting process.

In one instance, Schwartz, in U.S. Pat. No. 3,739,076, used a coil spring to evenly ground a braided metal outer shield of a coaxial cable to the connector such that each wire of the metal braid had the same firm, even, equal, electrical contact with the connector as every other wire of the braid. A coil spring surrounding an electric conductive band was used by Taj, as shown in U.S. Pat. No. 4,032,205, to hold the band in contact with the metal tape shield of a high voltage cable. A conductive rubber sleeve surrounded the entire connector to form a water-tight seal.

Another grounding device for high-voltage cable was described in U.S. Pat. No. 3,777,050, by Silva, as a sleeve of conductive elastomeric material having a corrugated metal band and a grounding rod seated within the band. A bolt-tightened clamp was slipped over the conductive sleeve and the device placed over the metallic shielding tape of a coaxial cable and the clamp tightened to effect connection of the tape to the grounding rod.

A simple grounded conduit expansion joint is described by Browne in U.S. Pat. No. 3,154,632 in which a folded ring of copper braid is compressed ahead of the normal packing in the expansion joint to effect sliding electrical contact between the members of the joint as they are tightened together in a threaded closure.

An internally and externally threaded collar is used by Niketas as shown in U.S. Pat. No. 4,408,822 with a conical bushing having annular spurs to anchor the outer sheath and conductive outer shield of a coaxial cable as the conical bushing is inserted under the outer shield and the outer shield and sheath forcefully clamped between the conical bushing and threaded collar to effect connection of the cable.

The references principally show means for grounding power cables and a non-standard coaxial termination to a single grounding pin, which can lead to low shield effectiveness.

BRIEF DESCRIPTION OF THE INVENTION

This invention solves the problem of terminating a coaxial electric cable comprising a conductive polymeric shielding layer of material surrounding an insulative polymeric core which surrounds a signal or power conductor down its center. The termination is effected in a standard electrical connector by wrapping a highly stressed conductive round metal wire or flat wound spiral spring around the outside of the conductive polymeric cable shield then compressing this spring between the cable and the connector to effect connection. This method provides mechanical and electrical connection in a standard manner to standard connectors and also provides a significant amount of strain relief to the cable.

DESCRIPTION OF THE PREFERRED EMBODIMENT

Figure 1:
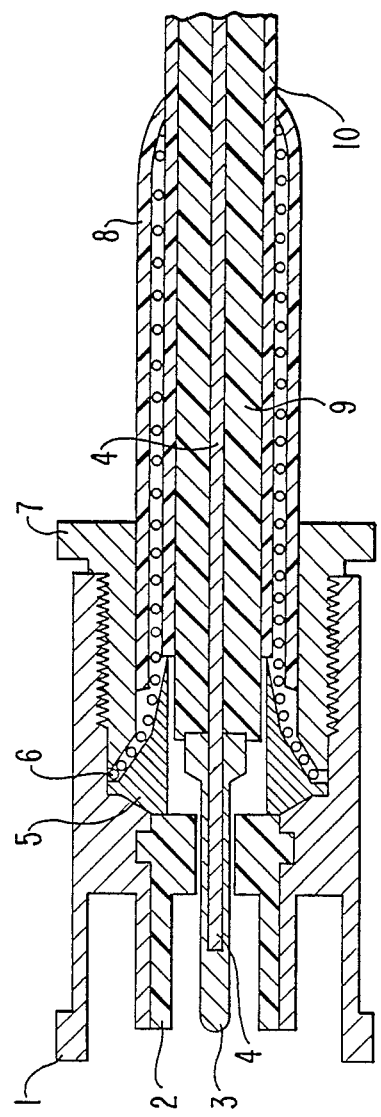
FIG. 1 shows a coaxial cable having an electrically conductive sheath which is wrapped in a conductive metal spring and the cable and spring connected to a standard electrical connector.

The features of the invention will be more fully understood and objects of the invention and advantages will be made apparent in the following description in terms of the drawing.

Referring now to the drawing, FIG. 1 shows a standard electrical connector of a type well-known in the art having affixed to it a coaxial electric cable which has a flexible conductive polymeric shielding 10 instead of a braided metal shield or metallized spirally-wound polymer tape shield. Non-metallic shields of this type are known to be difficult to terminate effectively electrically and/or mechanically to standard coaxial cable connectors.

The connector body 1 has seated in its center an apertured plug of insulation 2 which surrounds a metal center pin 3 which has been connected by soldering to the center conductor 4 of a coaxial cable. On an inner shoulder of connector body 1 is seated a centrally apertured conductive metal cone 5 which surrounds the cable and fits over the principal dielectric insulation 9 of the cable and the center conductor 4, which is soldered to pin 3 which fits through the apertures in core 5 and dielectric plug 2. Flexible conductive polymeric shield 10 is trimmed to just begin to overlap the sharp edge of core 5. Tightly spiralled about a short length of the cable under high tension and wrapped around shield 10 is a coil of conductive metal spring 6 which is also wound around the core 5. A layer of heat shrinkable polymeric sheathing 8 or jacketing to cover the portion of spring coil 6 lying outside the connector and to help waterproof the cable connection when termination is complete is placed around the cable to the edge of core 5. Tapered threaded sleeve 7 is now threaded into connector body 1 around the cable to engage the spring coil 6 between its tapered end and the slope of core 5 to effect complete electrical and mechanical connection of the cable to the connector. Coil 6, shrink wrap 8, and flexible conductive polymer shield 10 are then firmly held in place.

The flexible conductive polymeric shield 10 is manufactured from polymers such as polyurethane, polyvinyl chloride polytetrafluoroethylene, including porous expanded forms of polytetraflluoroethylene sold under the trademark GORE-TEX ®, polyethylene, polypropylene, or polycarbonate. To make the polymers electrically conductive, fillers of electrically conducting carbon or metal flakes, powders, spheres, or fibers of silver or steel are incorporated into them.

The shrinkable wrap material 8 may be a polyolefin, such as polyethylene or polypropylene, or polyvinyl chloride, polyester, polyurethane, or fluorocarbons excepting polytetrafluoroethylene. Material 8 may be conductively coated on the inside, such as with silver paint, to aid in insuring electrical continuity between the conductive polymeric shielding 10 and the connector.

The connectors used to terminate the cable may be any well known in the art which will grip spring coil 6 and the coaxial cable adequately for sure electrical and mechanical termination. The conductive polymeric shield end and the shrink wrap 8 end are also held in place firmly by threaded sleeve 7. This firm, strong termination provides a great deal of strain relief to the cable-connector joint and is one of the advantages of the invention.

It will be obvious to those skilled in the art that other modifications and variations in materials and methods may be made without departing from the scope of the invention which is described by the appended claims.

I claim:

1. A method for terminating a conductive polymer shielded coaxial cable comprising the steps of:
    (a) stripping an end of a coaxial electric cable to expose a length of center conductor, dielectric insulation surrounding said conductor, and conductive polymer shielding surrounding said dielectric insulation;
    (b) trimming said conductive polymer shielding and said dielectric insulation to equal length;
    (c) attaching said center conductor to a conductive metal center pin;
    (d) wrapping a highly-tensioned conductive metal coil spring around said trimmed conductive polymer shield, said coil spring extending past the end of said shield;
    (e) covering said coil spring with polymeric plastic shrinkable wrap from the cable end to the end of said conductive shielding;
    (f) shrinking said wrap in place on said coil spring and cable;
    (g) inserting said cable into a standard electrical connector, including an internal tapered cone portion for spreading inside and beneath said coil spring and a center passage for said center conductor and pin, and a tapered screw-threaded sleeve portion for engaging and holding said coil spring between its tapered portion and the tapered portion of said tapered cone; and
    (h) threading into torsional engagement said sleeve against said cone to complete the termination.

2. A terminated cable prepared by the method of claim 1.

3. A method of claim 1 wherein the flexible conductive polymeric shield is polyurethane, polyvinyl chloride, solid or porous polytetrafluoroethylene, polyethylene, polypropylene, polyester or polycarbonate.

4. A method of claim 3 wherein the conductive material is carbon, silver, or stainless steel.

5. A method of claim 4 wherein the conductive material is flakes, powder, spheres, or fibers.

6. A cable assembly comprising:
    (a) a coaxial electric cable which has been stripped at an end to expose a length of center conductor, dielectric insulation surrounding said conductor, and conductive polymer shielding surrounding said dielectric insulation said conductive polymer shielding and said dielectric insulation having been trimmed to equal length;
    (b) a conductive metal center pin attached to said center conductor;
    (c) a highly-tensioned conductive metal coil spring wrapped around said conductive polymer shield and extending past the end of said shield;
    (d) a polymeric plastic shrinkable wrap shrunk into place surrounding said coil spring from the cable end to the end of said conductive shielding; and
    (e) a standard electrical connector, including an internal tapered cone portion spread inside and beneath said coil spring and a center passage surrounding said center conductor and attached conductive metal center pin, an optional plug of dielectric insulation having a center passage surrounding said conductive metal center pin and a tapered screw-threaded sleeve portion engaging and holding said coil spring between its tapered portion and the tapered portion of said tapered cone, said sleeve being threaded into tensional engagement against said cone in a completed termination.

* * * * *